United States Patent [19]
Chapman

[11] 3,744,224
[45] July 10, 1973

[54] TOBACCO HARVESTER
[75] Inventor: Leonard A. Chapman, London, Ontario, Canada
[73] Assignee: Eagle Machine Company Limited, London, Ontario, Canada
[22] Filed: Feb. 18, 1972
[21] Appl. No.: 227,482

[30] Foreign Application Priority Data
    Feb. 25, 1970  Canada.......................... 075/838

Related U.S. Application Data
[62] Division of Ser. No. 52,345, July 6, 1970.

[52] U.S. Cl. .............................................. 56/27.5
[51] Int. Cl. ............................................ A01d 45/16
[58] Field of Search .................................... 56/27.5

[56]     References Cited
         UNITED STATES PATENTS
3,406,506  10/1968  Shriver et al. ....................... 56/27.5
3,507,103   4/1970  Pickett et al. ....................... 56/27.5
2,816,411  12/1957  Wilson ................................ 56/27.5
3,093,949   6/1963  Splinter .............................. 56/27.5

FOREIGN PATENTS OR APPLICATIONS
204,773  10/1967  U.S.S.R. ................................ 56/27.5

Primary Examiner—Antonio F. Guida
Attorney—Cushman, Darby & Cushman

[57]    ABSTRACT

Improved apparatus for harvesting growing tobacco leaves from a standing tobacco crop is described. The harvester includes means for orienting the tobacco leaves and maintaining such orientation during and after defoliation until deposition of the leaves in container means provided on the harvester. Improved leaf defoliator elements are provided and devices for separating leaves in the picking swath from those above the picking swath are provided. The harvester is designed such as to reduce leaf damage to a minimum. The harvester also includes improved means for effecting directional control thereof relative to the tobacco plants to still further reduce damage to the tobacco leaves.

5 Claims, 10 Drawing Figures

TOBACCO HARVESTER

This is a division of application Ser. No. 52,345 filed July 6, 1970.

The present invention relates generally to tobacco harvesting equipment and more particularly to apparatus for harvesting growing tobacco leaves from a standing tobacco crop.

In the harvesting of tobacco leaves which are to be subsequently flue-cured it is general practice to harvest the tobacco leaves over several successive pickings, such pickings being spaced apart by a suitable period of time depending upon the rate at which the tobacco leaves ripen. Since the bottom leaves of the tobacco plants ripen first, it is common practice to pick the bottom swath of leaves first, and as the tobacco leaves on the plants progressively ripen, to pick successively higher swaths until the entire stalk of each tobacco plant has been defoliated.

One procedure used for flue-curing the tobacco leaves is very well known and is in common usage today. Briefly, the tobacco leaves are formed into small groups with the butt ends of three of four of the leaves secured together, these small groups being then tied to a stick between four and five feet long. (In earlier years the leaves were tied to the sticks manually. In an effort to reduce the amount of labor involved mechanical tying machines were developed and were subsequently widely adopted by the industry.) These sticks with the groups of tobacco leaves suspended therefrom are then individually placed in the curing barn. The curing process used here is per se, well known and it need not be described here.

Another procedure for curing tobacco is known as bulk curing. This procedure does not require that the tobacco leaves be formed into groups and tied to sticks as described above. However, bulk curing has not been widely adopted by the tobacco industry.

For many years the above described picking, tying and curing operations were carried out manually; however, the large number of man hours required to raise, harvest and cure the tobacco coupled with ever increasing labor rates gave rise to a host of developments all designed to reduce the labor requirements for harvesting flue-cured tobacco.

Several early devices for use in the harvesting of flue-cured tobacco provided for carrying of the workers on a machine past the plant with the workers removing the leaves by hand from the plants and placing them in suitable receptacles. One variation in this is a machine incorporating a leaf conveyor to which the workers manually attached the leaves, the latter being then taken to a station on the machine where other workers removed the leaves from the conveyor and secured them to tobacco sticks. Harvesting aids of this nature have met with a certain amount of commercial success and are still used on many farms today. However, they have not materially reduced the total number of man hours required to harvest each unit area of tobacco.

In an effort to reduce the number of man hours required during harvesting a great deal of development work was carried out in the late 1950's and in the early 1960's in the hopes of devising suitable apparatus for mechanically defoliating the tobacco plants. Although a number of workable machines resulted, none of them achieved any degree of commercial success due to their inherent defects. In general, they were responsible for undue damage to the tobacco leaves; damage in some cases was done to the stalk of the tobacco plant during early pickings and in some cases this damage was severe enough to cause death of the tobacco plants; the machines tended to leave an excessive number of leaves on the stalk of the plant and/or lying on the ground at the end of the picking operation; furthermore, most of the machines had inadequate collecting devices for removing the leaves from the defoliating mechanisms and conveying them to storage receptacles. These early machines simply deposited the tobacco leaves in helter-skelter fashion in a collecting device and it was up to the workers to manually re-orient the leaves and form them into groups for placing on tobacco sticks. The additional labor required to tie the tobacco leaves to the sticks off-set in a large measure the savings in time achieved by mechanically defoliating the tobacco plants and this factor, combined with the loss and damage of the plants and leaves as mentioned previously, serve to make these mechanical tobacco harvesters unattractive to most tobacco growers.

Several years ago another harvester was developed wherein the picked leaves were placed into racks for bulk curing thus obviating the need to form the tobacco leaves into oriented groups. Since tangled leaves can be accommodated by the bulk curing process it seemed for a time as if this harvester might provide the answer to the problem. However, tobacco buyers were, and presently are, reluctant to purchase tangled tobacco leaves and as a result this form of harvester did not achieve significant commercial success.

In more recent years additional machines have been proposed wherein an attempt has been made to effect orientation of the tobacco leaves in such a manner that they might be cleanly removed from the stalks and subsequently replaced in a collecting receptacle while maintaining such orientation. Unfortunately, these proposals do not appear to have lived up to expectations and, so far as is presently known, commercial success has not been achieved.

One of the most notable deficiencies in previous mechanical tobacco harvesters has been their inability to pick with substantially constant efficiency ("efficiency" being used here to indicate the amount of tobacco leaf left on the stalk after picking) over a wide range of conditions and over the entire vertical span of the picking swath and of the plants. In any normal tobacco corp, each row of plants will be found to contain weak-stemmed plants and relatively strong-stemmed plants as well as plants which have drooping (flaccid) leaves all the way up to plants with erect (turgid) leaves Some of these conditions are constantly changing: for example, the attitude or angle of inclination of the leaves varies from hour to hour with each atmospheric change. Another deficiency is the inability of previous machines to effect the proper segregation between leaves in the picking swath and those immediately above the picking swath. As a result much leaf damage was caused. A still further serious deficiency was the inability of these previous machines to cleanly remove leaves from the stalk regardless of their angular orientation with respect to the harvester. Many machines, for example, were incapable of cleanly removing many of the leaves extending parallel or substantially parallel to the path of travel of the harvester as it moved along the row of tobacco plants. In addition, the picking efficiency of these machines was not constant over the entire vertical span of the picking swath due to the inflexibility of the defoliating elements and their inability to accommodate with equal ease leaves lying at the extreme top and bottom of the picking swath.

It is a general object of the present invention to provide a tobacco harvester which overcomes, to a very significant degree the problems inherent in the prior art devices and which will harvest automatically the tobacco leaves with an operating efficiency, in terms of tobacco loss and/or damage, which, in average crop conditions is acceptable to tobacco growers.

Other objects of the invention are: to provide improved ways of orienting the tobacco leaves per se and maintains such orientation until and during their deposition in container means; to provide improvements in the means; defoliator means; to provide means for separating leaves in the picking swath from those above it and to provide improved devices for preventing substantial leaf damage.

In accordance with one aspect of the invention there is provided a tobacco harvester including means to enable the harvester to travel along a row of tobacco plants, defoliating means for removing tobacco leaves lying in a picking swath from the standing row of plants and leaf divider elements for positively separating leaves lying above the picking swath from those lying within the latter. The leaf divider elements preferably include freely rotatable roller means for effecting an initial separation of said leaves and a leaf divider sheet extending rearwardly of each roller means to maintain said separation. Leaf orienting means are provided to orient the leaves in the picking swath to assist in the defoliation thereof.

In a more restricted form of the last-mentioned aspect of the invention the harvester includes a pair of picking units arranged to be carried along both sides of the row of tobacco plants with each picking unit having said defoliating means, roller means and leaf divider sheet respectively associated therewith. The leaf divider sheets extend towards each other from their respectively associated picking units with their inner confronting marginal edges being spaced apart to define a passageway for the plants of said row as the harvester moves therealong. In addition, the harvester preferably includes endless guide belts extending along the above mentioned confronting marginal edges. Means are provided for supporting and driving each guide belt in an endless path at a velocity such that the runs of the guide belts extending along the passageway move at substantially zero velocity with respect to the stalks of the plants in the row as the harvester moves therealong whereby the guide belts are capable of supporting the plants without causing damage thereto.

In the drawings which illustrate an embodiment of the invention.

GENERAL ARRANGEMENT

Referring now to the drawings wherein like reference numerals designate like parts, it will be seen that the tobacco harvester 10 includes a high clearance tractor unit 12 which serves to provide support and conveyance for the tobacco leaf picking, orienting, elevating, and storage units to be hereinafter described. The high clearance tractor 12 is of the type which is, per se, well known in the art and includes longitudinally extending frame members 14 suitably interconnected by transverse frame members thus defining a support frame for the various components of the harvester. Secured to opposing sides of the support frame adjacent the rear of the harvester are vertically extending frame members 16 to the lower ends of which are connected rearwardly disposed propelling wheels 18. Propelling wheels 18 are driven by suitable chain, sprocket, drive shaft, clutch and gear box means from a drive engine 20 mounted on the support frame adjacent the rear of the harvester. A further vertically extending frame member 22 adjacent the front end of the harvester has a single steerable front wheel 24 connected to the lower end thereof; this steerable front wheel 24 is connected by suitable steering linkage and gear box means 26 to a steering wheel 28 located in a suitable position for control thereof by the operator. Suitable clutch and brake means (not shown) are also provided.

Since the harvester of the present invention is designed to effect picking of tobacco leaves from plants arranged in spaced apart rows, it is desirable that means be provided to assist the operator in following the row accurately thereby to avoid damage to the tobacco plants. For this purpose, a feeler guide arrangement 30 is provided which is coupled by a suitable frame 32 to the steerable front wheel 24 of the harvester. This guide arrangement includes a feeler member 34 which is laterally off-set from the path of travel of the front wheel of the vehicle and which is arranged to contact lightly the stalk of each tobacco plant a short distance above ground level as the harvester proceeds along the row of tobacco plants. Hence, the operator can, by feel, maintain the front wheel of the harvester, and hence the picking units to be hereinafter described, at a specified distance from the row. Although the arrangement shown provides direct rigid connection between the feeler member 34 and the steerable front wheel of the vehicle, it is to be understood that a power steering unit may be interposed between feeler member 34 and the front wheel of the vehicle thereby to simplify the operator's task even further.

Suspended from the elevated support frame referred to above by means of hanger bars 36, are right and left hand picking units broadly designated as 38 and their respectively associated right hand and left hand leaf elevating and storage units broadly designated as 40. The picking units 38 are essentially identical in structure to one another except for their right hand and left hand nature (i.e. they are mirror images of one another) and they are spaced apart so as to define therebetween an opening through which the tobacco plants pass as the harvester travels along the row. In order to satisfy current requirements for picking flue-cured tobacco by picking the bottom swath of leaves first and thereafter picking successively higher swaths of tobacco leaves oversuccessive further pickings until the entire length of each tobacco stalk has been defoliated, the right and left hand picking units 38 are vertically adjustable relative to the support frame to permit the picking units and their associated structures to be shifted upwardly as required. This is readily accomplished by connecting the vertically disposed connector bars 36 to the support frame by means of adjustable brackets 42.

It is further contemplated that the picking units 38 and their associated structures be provided with mountings which will allow them to move laterally. In this case a feeler guide could be coupled to the picking units in such a manner as to cause them to follow the row independent of minor deviations in the direction of vehicle travel in relation to the row being picked. This arrangement could be provided as an alternative or in addition to the guide arrangement for the steerable front wheel 24 of the vehicle as described previously.

LEAF DIVISION AND ORIENTATION

Figure 4:
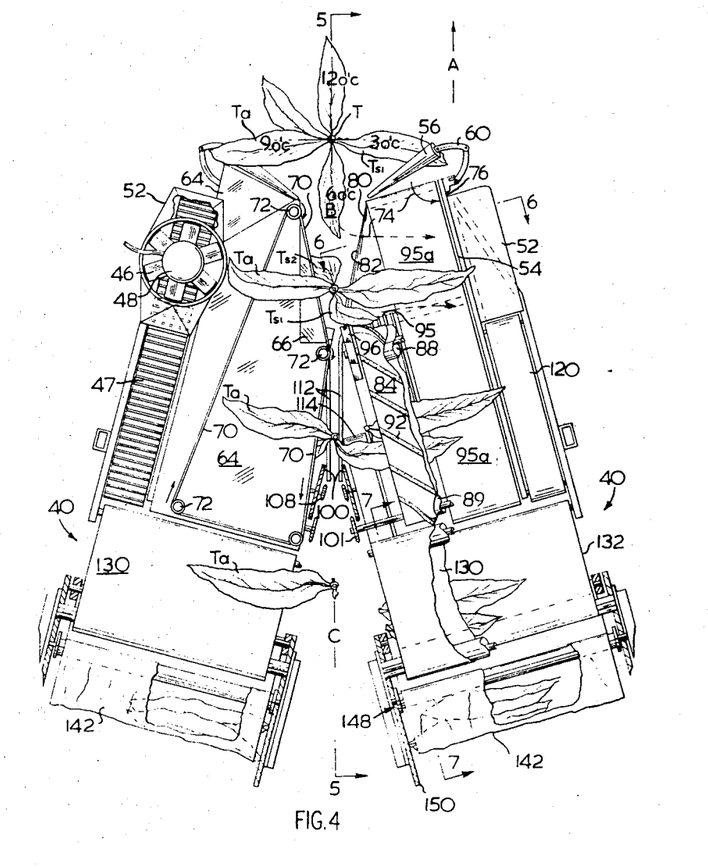
FIG. 4 is a fragmentary plan sectional view of the tobacco harvester taken along line 4—4 in FIG. 3 and looking in the direction of the arrows.

Turning now to the picking units 38 per se, attention will first of all be given to the leaf divider elements and to the means for properly orienting the tobacco leaves before defoliation. With reference to FIG. 4 it will be seen that as the harvester travels in the direction of the arrow A, the tobacco plants T enter through the V-shaped in plan opening B defined between the two picking units forwardly of the harvester and leave through the V-shaped in plan opening C rearwardly of the harvester. The right hand and left hand picking units are, of course, spaced apart sufficiently as to provide a passage interconnecting openings B and C to permit passage for the stems of the tobacco plants between the two picking units. In order to provide for leaf orientation each picking unit 38 is provided with a vacuum source 44 each of which comprise a suction fan 46 driven by a respective electric or hydraulic motor 48. The electric or hydraulic motors 48 are supplied with energy from a generator or hydraulic pump as the case may be (not shown) suitably connected to drive engine 20. Each vacuum producer 44 is connected by a short length of duct work 50 to an associated intake chamber 52. Each intake chamber 52 is provided with an intake mouth 54, the latter being arranged to draw air inwardly in directions extending generally transversely of the row of tobacco plants in a manner to be described more fully hereinafter. The vacuum producers 44 are of sufficient capacity as to cause air currents to be set up which are sufficiently large as to cause the leaves of the tobacco plants to be swung around such that they extend generally transversely of the tobacco row. In order to prevent damage to suction fans 46 a suitable endless belt-like screen 47 is provided between the intake mouth 54 and the associated vacuum producers. The screen preferably moves or is driven rearwardly in timed relation to the movement of the harvester such that its velocity in relation to the velocity of the plants is zero thereby preventing damage to the tobacco leaves.

Figure 1:
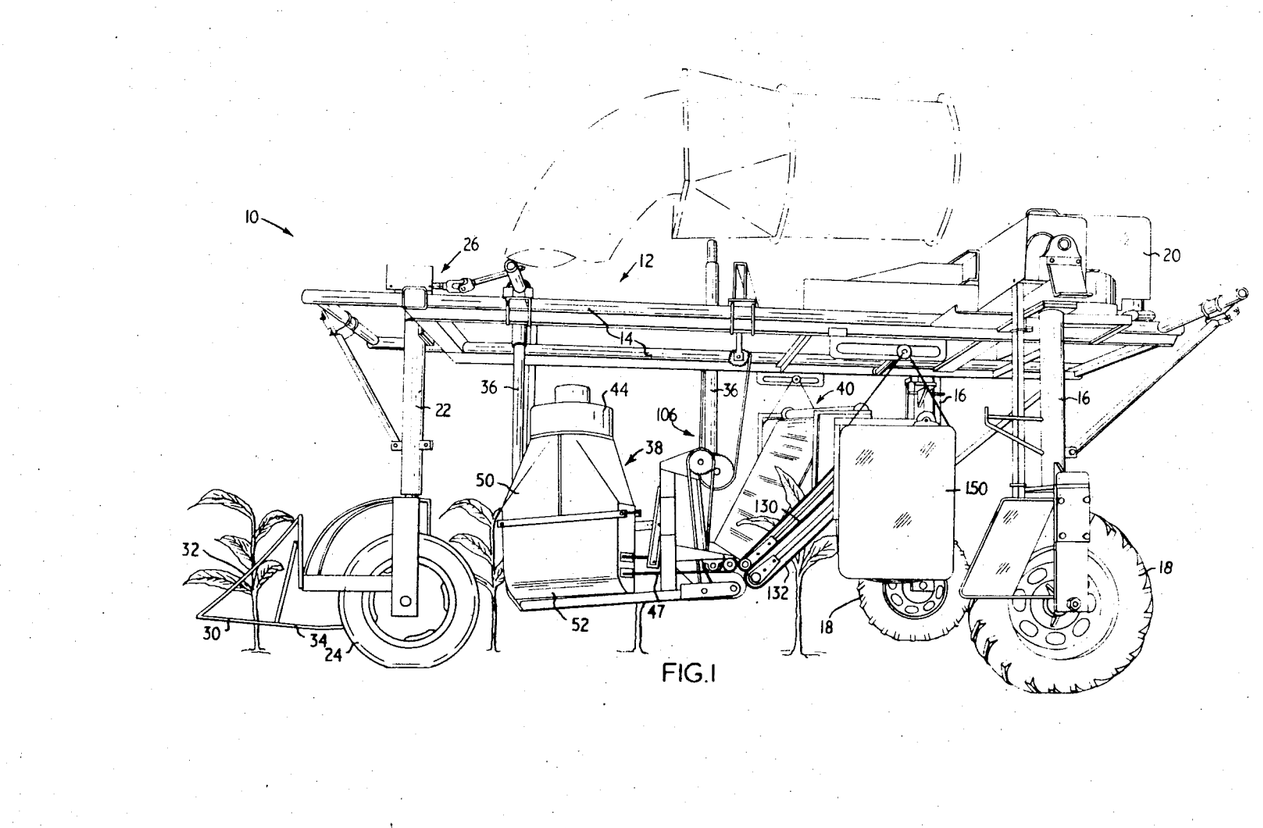
FIG. 1 is a side elevation view of a tobacco harvester in which the principles of the invention have been incorporated.
Figure 2:
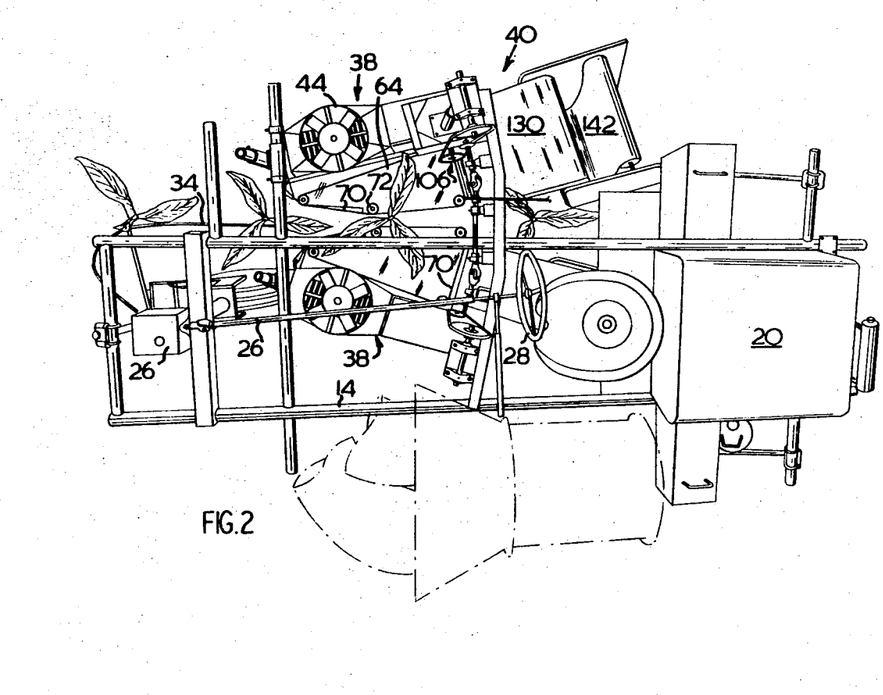
FIG. 2 is a plan view of the tobacco harvester.
Figure 3:
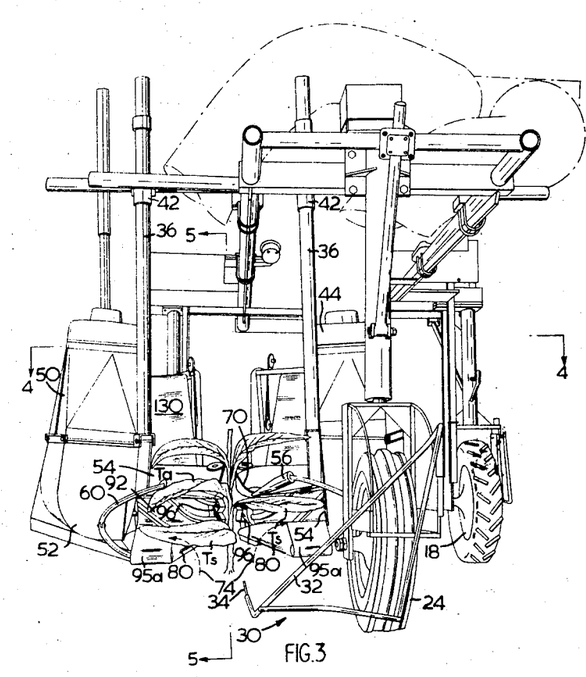
FIG. 3 is a perspective view of the tobacco harvester as seen when generally looking toward the front end of same.

As an alternative to the individual vacuum producers described above, a single vacuum producer may be mounted on the main support frame and driven directly from the drive engine. Elongated ducts would then be connected to the vacuum producers and to the respective intake chambers. This alternative arrangement is shown in phantom in FIGS. 1, 2 and 3; however, the arrangement previously described is preferred for reasons of compactness, increased driver visibility and low air friction losses since the need for long ducts, elbows and the like is obviated.

Reference will now be had to the leaf divider elements; these are best shown in FIGS. 3, 4, 5 and 5A. On referring to FIG. 4 it will be realized that certain portions, such as the suction producer, the screen associated therewith and the upper components of the leaf divider have been removed or cut away from the right hand picking unit in order to more clearly illustrate the operation of the device.

Figures 5, 5A:
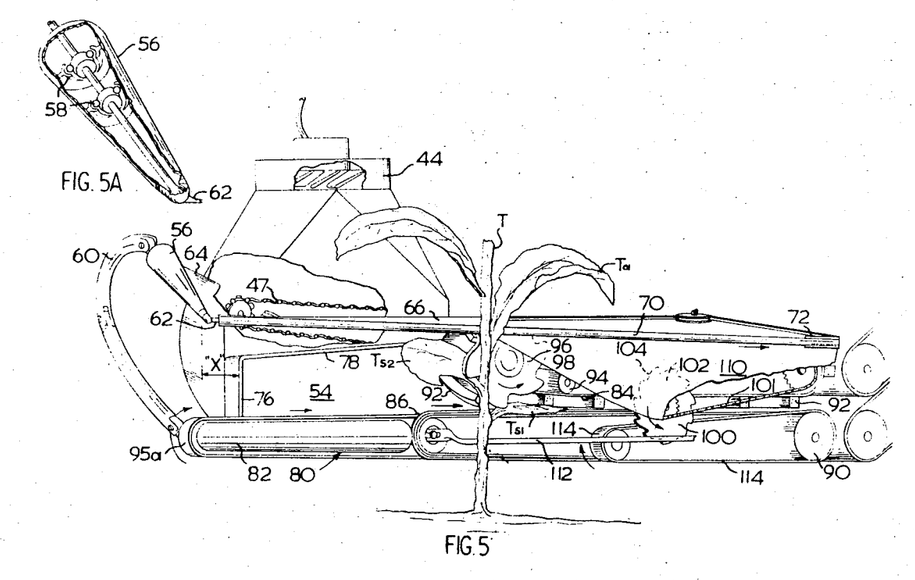
FIG. 5 is an elevation view of the right hand side of the leaf picking unit, such view being taken along line 5—5 in FIG. 3 and looking in the direction of the arrows.
FIG. 5A is a perspective view of one of the leaf divider rollers with a portion thereof cut away to show the interior structure.
Figure 6:
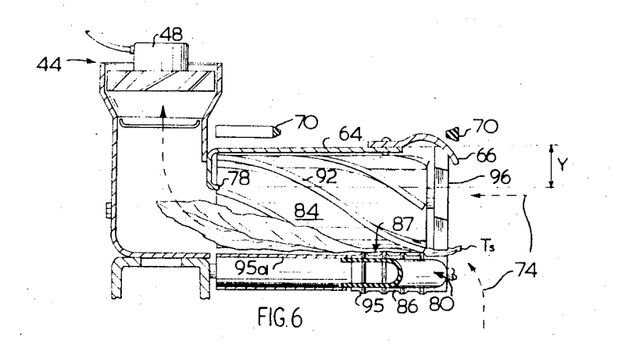
FIG. 6 is a cross sectional view of the right hand side of the picking unit taken along line 6—6 in FIG. 4 and looking in the direction of the arrows.

The leaf divider arrangement includes cone-shaped idler rollers 56 which serve to effect the initial separation of tobacco leaves $T_a$ above the picking swath from leaves $T_s$ which are within the picking swath. The idler rollers 56 are each mounted on suitable bearings 58 to allow the rollers free rotation when the tobacco leaves brush against them. Each idler roller is supported at its outer end by an adjustable bracket 60 and at its inner end by a bracket 62 connected to its associated leaf divider sheet 64 which extends rearwardly of the associated roller 56 at approximately the same elevation as the latter and which serves to maintain leaf separation after the initial separation by the divider roller. The two leaf divider sheets are best seen in FIGS. 4–6 and they each extend inwardly from their associated picking units towards the row of tobacco at a level above each intake mouth 54, with the previously mentioned passageway for the plants being defined between their inner confronting marginal edges. Leaf divider sheet 64 is removed in the plan view of FIG. 4 of the right hand unit in order to simplify illustration. Although the preferred configuration of idler rollers is conical, a roller that is cylindrical or some other shape but functioning to present a rolling surface to the leaves would still be suitable for purposes of the invention. As shown in the drawings, the idler rollers rotate about axes which are directed generally downwardly are rearwardly and about an angle of 45° to the row of tobacco plants as seen in plan view. It may be found necessary to make a small adjustment in the orientation angle of the dividing sheets 64 and their associated rollers 56 thereby to incline them to suit approximately the angle at which the tobacco leaves grow thereby to accommodate a wide range of crop conditions. It will be appreciated that the function of the leaf divider rollers 56 is to reduce the damage that would otherwise occur when a non-yielding object, such as the leading edges of the leaf divider sheets 64 are passed through the growing tobacco leaves. In order to further reduce pressure against the growing leaves and damage thereto, the edges of the divider sheets 64 which tend to come in contact with the plants, are made of a flexible material such as rubber 66 as best seen in FIGS. 4–6. The flexible rubber edge portion 66 on the leaf divider sheets permit flexure of this part of the divider in the event of vertical movement of the machine relative to the stalk of the tobacco plant during travel. Lack of such flexibility tends to result in breakage of some of the leaves from the stem before they are secured by the picking elements.

Extending along the opposing edges of the leaf divider sheets 64 are endless guide belts 70. One guide belt 70 only is shown in FIG. 4 but it will be understood that one guide belt is associated with each leaf divider sheet 64. Each endless guide belt 70 is entrained about a plurality of small pulleys 72 at least one of chain is driven by suitable chair and sprocket means (not shown) at a speed such that the run of the guide belt 70 which comes in contact with the tobacco plants moves at zero velocity relative to the ground. Therefore, in operation, as the harvester advances along the row of tobacco plants, the upper leaves $T_a$, which have been initially separated from the leaves $T_s$ by rollers 56, rest against the opposing guide belts 70, the latter serving to support these leaves as the plant travels through the narrow passageway defined between the opposed picking units 38.

As the harvester advances down the row of tobacco plants, the lower leaves $T_s$ which all lie within the picking swath, after leaving the leaf divider rollers 56, pass under the leaf divider sheets 64 into the air streams produced by the vacuum producers 44. The direction of movement of the air streams is indicated by the broken arrows 74 from which it will be seen that these air currents extend generally upwardly between the picking units, thereafter dividing and going toward the opposed intake mouths 54 in opposite directions generally transversely of the tobacco row. Experience has shown that the leaf divider elements 56, 64, 66 and 70 must be isolated from the air stream and that the air stream must be directed away from the leaves $T_a$ which grow above the picking swaths. If substantial air currents are allowed to flow over the surfaces of these parts, particularly air currents in a downward direction between the left hand and right hand picking units 38, the leaves $T_a$ just above the picking swath are liable to be drawn against the leaf divider elements with the result being that certain of these leaves $T_s$ are either pulled off the plant or are damaged by bruising or tearing. In order to avoid these undesirable air currents, the positions of the intake mouths 54 relative to the leaf divider elements are selected so as to reduce air movements in these critical areas to an acceptable level. In addition, auxiliary structures are provided to still further reduce these undesirable air currents while at the same time assisting air flow in the correct directions as indicated by the broken arrows. Referring particularly to FIGS. 4 and 5 it will be seen that the leading vertical edge 76 of each intake mouth 54 is disposed a sufficient horizontal distance "X" behind its respectively associated leaf divider roller 56 as to effect a minimum amount of air flow over the latter. Referring to FIG. 6 it will be seen that the upper, generally horizontally disposed edge 78 of the intake mouth 54 of the right hand picking unit is disposed a sufficient vertical distance "Y" below the associated leaf divider sheet 64 as to effect a minimum amount of air flow downwardly towards and along the upper surface of the latter. The edge 78 appears to act as a "spoiler" insofar as the above mentioned undesirable air currents are concerned with the result being that a comparatively static body of air occupies the relatively shallow concave area bounded by edge 78, leaf divider sheet 64 and the somewhat downwardly curved flexible leaf divider sheet edge portion 66 all as seen in FIG. 6.

While the avoidance of downward currents of air between the left and right hand picking unit is highly desirable, it is, on the other hand, desirable to achieve an upward flow of air between the picking units in order to lift drooping tobacco leaves which might possibly be growing in the lower part of the picking swath. This upward flow of air is particularly desirable in the first picking, since in this case the picking swath extends upwardly from ground level and, in the absence of upward currents of air between the two picking units, tobacco leaves lying very close to ground level might be missed by the harvester altogether. In order to promote this upward flow of air between the picking units, the lowermost edge of each intake mouth 54 is disposed on a level with or slightly below the upper surface of an associated lower leaf guide 80. As can be readily seen from FIGS. 3 through 6, each picking unit includes a lower leaf guide 80 each disposed below and in vertically spaced relation with its associated leaf divider sheet 64 with the two lower leaf divider elements 80 together with their associated leaf divider sheets 64 serving to define the previously referred to V-shaped in plan opening B. Each lower leaf divider element 80 is shaped so as to promote the previously referred to upwardly directed flow of air indicated by arrows 74 in FIG. 3. For this purpose each leaf divider element has its leading edge portion 82 smoothly rounded and contoured thereby to reduce turbulence in the currents of air flowing thereover towards its associated intake mouth 54. As a result of the above described arrangement the leaves in the picking swath $T_s$ which are disposed in the air stream created by the suction producers 44 will orient themselves to positions with their tips pointing generally towards the opposing intake mouths 54 on both sides of the plant as best illustrated in FIG. 4. These leaves are now in a position for engagement by the several defoliator elements as will now be described.

DEFOLIATORS

Figure 5B:
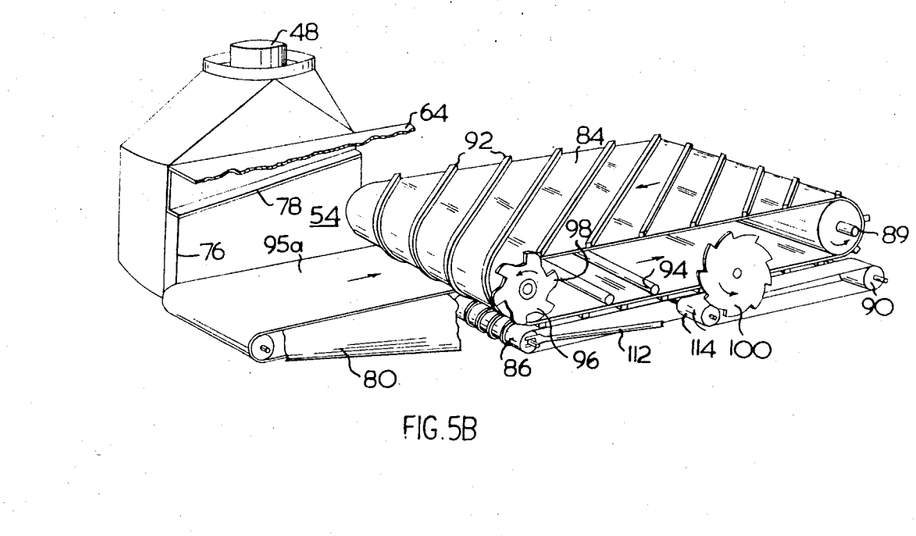
FIG. 5B is a perspective view of a portion of the right hand side of the leaf picking unit further illustrating the defoliating elements.

The structure of the defoliator elements will be readily apparent from a review of FIGS. 4 through 6. Each picking unit includes superposed belts, i.e. an upper defoliator belt 84 and a lower defoliator belt 86 below and in contact with the upper defoliator belt 84. Defoliator belts 84 and 86 are disposed just rearwardly of an associated one of the lower leaf divider elements 80 and arranged such that the upper surface of the latter is at about the same level as the entrance nip 87 defined between the lower run of belt 84 and the upper run of lower defoliator belt 86. Each belt 84 is entrained about a front roller 88 and a rear roller 89 while each lower defoliator belt is entrained about spaced rollers 90. The upper and lower defoliator belts are generally coextensive in length and they are arranged such that their longitudinal axes diverge away from the longitudinal axis of the harvester i.e. away from the row of tobacco plants) from the front end to the rear end of the harvester. The upper defoliator belt 84 is provided with a plurality of spaced apart cleats 92 which extend diagonally across the width of the belt; each cleat is of a soft foam rubber or synthetic material to accommodate the relatively fragile tobacco leaves without damage. As seen in FIGS. 5, 5B and 6 the cleats on the lower run of the upper defoliator belt 84 engage the upper run of lower defoliator belt 86 and apply pressure thereto so as to firmly engage tobacco leaves therebetween; spaced apart rollers 94 are of assistance here in preventing undue deflection of the defoliator belts 84 and 86 between their respective support rollers. To further assist the upper and lower defoliator belts in engaging tobacco leaves therebetween, the lower defoliator belt may be provided with a plurality of spaced apart longitudinally extending ribs 95 as best seen in FIG. 6.

In order to support the end portions of certain of the tobacco leaves and press them against the upper defoliator belt 84, an additional belt 95a is provided (See FIGS. 4, 5 and 5B) on each picking unit which extends from the foremost extemity of its associated lower leaf divider 80 rearwardly past the lower edge of intake mouth 54 (See FIG. 6) parallel to and with its upper run in the same plane as the upper run of the lower defoliator belt 86. The belt 95a is journalled at its front end on a suitable idler roller (not shown) and at its rear end is supported on and driven from an extended portion of previously referred to roll 90. As seen in FIGS. 5B and 6 the upper defoliator belt 84 is wide enough to extend the full width of both the belt 86 and the belt 95a.

Mounted on the end of each front support roller 88 for the upper defoliator belt 84 for rotation therewith is a defoliator wheel 96 having a plurality (in this case six) of relatively large teeth 98 as best seen in FIGS. 5 and 5B. The opposing defoliator wheels 96, being positioned quite close together on opposing sides of the longitudinal axis of the harvester and hence also on opposing sides of the row of tobacco plants, are hence capable of engaging the tobacco leaves quite closely adjacent their points of of connection to the stalk of the plant. As seen in FIG. 5 the teeth 98 of each defoliator wheel have generally straight leading edges (alternatively they may be slightly concave) generally radially arranged with respect to the center of the wheel. As the defoliator wheel 96 is rotated in the direction shown by the arrow in FIG. 5, and as the upper and lower defoliator belts together with belts 95a are moved also as shown by the arrows in FIG. 5, the teeth 98 serve to assist in feeding the leaves in the picking swath into a position under the cleats 92 of the upper defoliator belt. When these cleats 92 engage the leaves, the latter are drawn into the entrance nip defined between the upper defoliator belt, the lower defoliator belt 86 and the additional belt 95a. As mentioned previously the cleats 92 and the ribs 95 assist in preventing the leaves from being pulled out from between the defoliator belts during defoliation.

There are several reasons as why the teeth of the defoliator wheel 96 are made of a resilient material. Firstly, some leaves are inevitably contacted by the teeth at a position other than the butt end of the leaf; if the defoliator wheel teeth were rigid these leaves would be damaged. Secondly, if the defoliator teeth were rigid many tobacco leaves would be removed from the stalk u upon initial contact thereof by the teeth and some of the leaves would undoubtedly fall to the ground or be lost to the air suction. Experience has shown that the resilient teeth 98 of the defoliator wheel will act to apply a gradual pressure to the leaves thus causing them to be drawn under the upper defoliator belt 84 during defoliation.

As mentioned previously, the upper and lower defoliator belts 84 and 86 as well as belts 95a associated with each picking unit are, together with their associated structures, disposed such that their longitudinal axes diverge away from the longitudinal center line of the machine and hence away from the row of tobacco plants from the front to the rear of the machine. This angle may vary somewhat. In the embodiment shown a horizontal angle of 30° between the longitudinal axes of the belts was found suitable (i.e. 15° to the row of tobacco plants). This diverging angle feature has the following functions:

1. Those leaves which grow in the 4 o'clock to the 8 o'clock positions relative to the approaching harvester (the 12, 3, 6 and 9 o'clock positions of the tobacco leaves are indicated on FIG. 4) and particularly those which grow in the lower portions of the picking swath present a rather difficult problem. By setting the defoliator belts at the diverging angle indicated above, the outer ends of the above mentioned leaves are conveniently drawn away from the center line of the row of tobacco. This is accomplished by driving the gripping surfaces of the cleats and belts i.e. the rib and cleat portions of the upper and lower defoliator belts together with the upper runs of belts 95a when in contact with each other) rearwards at a speed such that their components of velocity parallel to the direction of harvester travel in relation to the tobacco plant being picked are substantially zero. The velocity component transverse to the direction of harvester travel results in a sideways or lateral displacement of the gripping portions of the belts relative to the stalk of the plant as the machine passes the plant which serves to pull the outer part of the engaged tobacco leaf in a direction away from the plant.

2. The diverging angle feature is also useful in connection with all of the leaves after defoliation in that it permits the leaves to be carried a sufficient distance outwardly and away from the stalk of the picked plants while permitting them to be elevated or deposited in suitable containers with as little interference as possible with the growing leaves remaining on the plant above the picking swath.

In order to sever any tobacco leaves in the picking swath from the stalk which remain attached after having been acted on by the defoliator wheels 96 and the upper and lower defoliator belts 84 and 86 respectively, each picking unit includes a rotating cutter wheel 100 (see FIGS. 4, 5 and 5B). These cutter wheels are disposed on opposing sides of the row of tobacco plants well behind the defoliator wheels but before the upper and lower defoliator belts terminate so that leaves which are severed from the stalk by the cutter wheels 100 remain engaged between the upper and lower defoliator belts for a short period of time. The rotating cutter wheels are each provided with a plurality of teeth 102 having rearwardly sloping sharp cutting edges 104.

The previously mentioned defoliator belts 84 and 86 and their associated defoliator wheels 96 are driven via suitable chain and sprocket means 106 driven in timed relation to the movement of the harvester along the tobacco row from the harvester engine 20. The cutter wheels 100 are driven via respective drive sprockets 108 through suitable chain and sprocket means 101 driven from the rear support roller 89 for the upper defoliator belt.

OPERATION OF THE DEFOLIATOR ELEMENTS

The general structure and function of each defoliator element has been described above. It is important to realize that each defoliator element is designed to overcome the particular problems associated with the picking of tobacco leaves which grow in particular regions of the picking swaths relative to the harvester. Each region of the picking swath and the function of the defoliator elements in connection with that region will now be described. For the sake of simplicity only the action of the right hand defoliator unit (as seen in the plan view of FIG. 4) will be described. Since the two picking units are mirror images of one another it will be realized that when mention is made of the operation of the right hand picking unit with reference to leaves growing, for example, between the three and six o'clock positions, that the left hand picking unit will operate in identical fashion in respect to those leaves growing between the six o'clock and nine o'clock positions.

Region I

Region I lies in the lower one-fifth of the picking swath and comprises leaves growing between the 3 and 6 o'clock positions with respect to the approaching harvester. These leaves are engaged by and pass under the toothed defoliator wheel 96 and the cleats 92 in the upper defoliator belt. These leaves thus pass into the region between the upper and lower defoliator belt with cleats 92 pressing the tobacco leaves against ribs 95 on lower defoliator belt 86. The previously mentioned support rollers 94 assist in maintaining pressure on the leaves. As a result of the divergence of the defoliator belts away from the row of tobacco plants, the ends of the leaves disposed between the defoliator belts are progressively displaced laterally away from the center line of the row as the harvester moves forwardly. As a result of this outward pulling action, many of these tobacco leaves are pulled off the stalk by the action of the defoliator belts alone. However, in the event that they are not pulled off the plant by the time they reach the rotating cutter wheel 100 they are cleanly severed by the latter at that point. The position of these particular leaves during defoliation is illustrated at TS 1 in FIGS. 4 and 5.

Region II

Region II lies in the upper four-fifths of the picking swath and comprises the leaves growing between the 3 and 6 o'clock positions with respect to the approaching harvester. These leaves are engaged by and pass under both the toothed defoliator wheel 96 and the cleats 92 of the upper defoliator belt. These leaves are generally forced off the stalk by the combined downward pressure of defoliator teeth 98 and cleats 92 and/or by the pulling action of the upper and lower defoliator belts as described in the previous paragraph.

Region III

Region III comprises the remaining portion of the picking swaths and comprises leaves growing in the entire vertical span of the swath between the 12 and 3 o'clock positions with respect to the approaching machine. The position of a typical leaf in this region during defoliation is illustrated at $T_{s2}$ (FIG. 5). These leaves are first engaged by the teeth 98 of defoliator wheel which forces them downwardly and rearwardly and acts to pass them into the entrance nip between the cleats 92 of the upper defoliator belt and the upper surfaces of lower defoliator belt 86 and additional belt 95a. Most of the leaves are removed at this point from the stalk by the sideways and/or downwards motion imparted thereto due to the action of the aforementioned cleats 92 and toothed defoliator wheel 96. Leaves at the extreme bottom of the picking swath, particularly those in a relatively tough condition will not be removed cleanly at this point but will remain attached to the stalk until such time as they are severed by the actual cutting blade 100.

It has been found that the pulling action created by the upper and lower defoliator belts 84 and 86 has a tendency to pull the plant onto the cutter blades 100. In order to prevent this from occurring, a guard 110 is provided which covers the upper portions of each cutter blade. Additionally guide rails 112 are provided each of which extends longitudinally of the harvester and serves to support and prevent damage to the stem when in the vicinity of the cutter blades 100. It is contemplated that the guide rails 112 could be modified to carry a moving belt which would contact the plant stock and thereby assist in its passage relative to the harvester. This would in no way detract from the primary function of the guide rails.

It will be further noted that each picking unit includes a relatively short and narrow belt 114 which extends from a position in front of the cutter blade to a position rearwardly thereof. In the embodiment being described the rear end of the short belt 114 is entrained about the rearward one of the rollers 90 about which the lower defoliated belt 86 is also entrained. The function of this narrow belt 114 is to further support the leaf (especially small leaves) during and after being acted upon by the blade 100.

In order to achieve the desired compactness of design, the tips of extremely long tobacco leaves are allowed to extend into the intake mouths 54 before, during and immediately after defoliation. The tips of these long leaves are sucked against the previously referred to moving screen 47 and are thus stabilized while being carried by the defoliator belts out of the air stream. Loose tobacco leaves which may have escaped the defoliator mechanism are also arrested by moving screen 47. These leaves are carried rearwardly to the elevator (which will be described hereinafter) by the action of moving screen 47 and a further lower belt 120. As best seen in FIG. 4, belt 120 commences just rearwardly of the intake mouth 54 and extends rearwardly with its upper surface in coplanar relation with the lower runs of lower defoliator belt 86 and additional belt 95a. It is to be understood that those leaves which have escaped the defoliating mechanism will be in random alignment but since they constitute a relatively small proportion of the total leaves harvested they do not present a major problem.

STRUCTURE AND OPERATION OF THE ELEVATOR AND LEAF CONTAINER APPARATUS

The picked leaves are transferred via the motion of the previously described belts 84, 86, 95A etc. to the previously mentioned leaf elevating and storage units 40. A leaf elevating and storage unit 40 is associated with each of the picking units 38 and, as before, only the right hand unit will be described.

Figure 7:
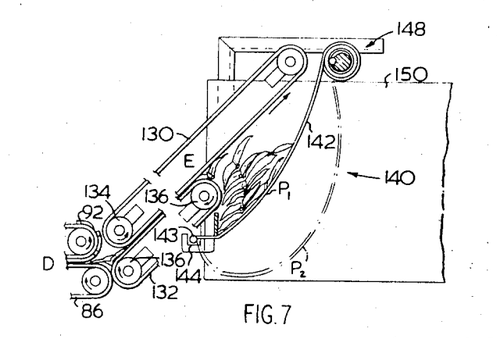
FIG. 7 is an elevational view in section through the leaf container and elevator taken along line 7—7 in FIG. 4 and looking in the direction of the arrows.

With reference to FIGS. 4 and 7 it will be seen that the elevating device includes conveyor belts 130 and 132 entrained about respective spaced pairs of rollers 134 and 136. These rollers are driven by suitable means (not shown) at the same surface speed as are the previously described defoliator belts. It will be seen from FIG. 7 that the conveyor belts 130 and 132 extend upwardly and rearwardly from the rear end portions of the upper and lower defoliating belts 84 and 86 respectively so that the picked leaves may pass from the defoliator belts into the nip defined between superposed conveyor belts 130 and 132. The bottom run of upper conveyor belt 130 exerts a light pressure on the top run of the lower conveyor belt 132 sufficient to elevate the picked leaves from position D to position E. It will be noted that the lower conveyor belt 132 terminates part way along the length of the upper conveyor belt 130 thus determining the above mentioned position E at which point the picked leaves are discharged into the leaf container broadly designated as number 140.

Those skilled in the art will appreciate that it is important to retain each tobacco leaf in a properly oriented manner during the entire operation from its picking to its placement in a receptacle used for its transportation from the tobacco field. Control of the leaf with respect to orientation is assisted by means of the leaf container 140 illustrated in elevation in FIG. 7 and in plan in FIG. 4. A primary element of the leaf container is a flexible sheet 142 which underlies the discharge point E and which is made of any suitable flexible material such as canvas or the like. As seen in plan in FIG. 4 this sheet 142 is of about the same width as the width of the conveyor belts 130 and 132 of the leaf elevator and, as seen in elevation in FIG. 7 is connected at its lower edge to a bracket 144 which is disposed below and just forwardly of the discharge point E. Preferably, the lower edge of the sheet 142 is connected to an elongated supporting bar 143 which is hooked at its opposing end into the bracket 144 thereby to permit flexible sheet 142 to be disconnected from the harvester when the flexible sheet 142 contains a full load of leaves. The upper or opposite end of flexible sheet 142 is connected to a tensioning reel 148. Tensioning reel 148 applies a substantially constant tension to sheet 142. The object of applying this tension to the sheet is to substantially eliminate free fall of the picked tobacco leaves T from discharge point E into the container, and this is achieved since the tensioned sheet 142 continually urges the collected leaves upwardly towards the discharge point E. In FIG. 7, the full line position P1 of flexible sheet 142 indicates the approximate position of the sheet when the leaf container is empty, while the dotted line position P2 indicates the approximate position of sheet 142 when the leaf container has been filled. When the sheet 142 is in the distended P2 position, it will be appreciated that an additional length of sheet has been unwound from tensioning reel 148 as a result of the pressure or tension on the sheet created by the weight of the tobacco leaves. The importance of controlling the free fall distance is that orientation may be lost due to the tendency of the tobacco leaf to turn over sideways or end over end when dropped a distance greater than its width. This tendency is increased in turbulent air. In order to prevent the tobacco leaves from shifting endwise and falling onto the ground after they have been received in the leaf container, rigid side members 150, which may be made of plywood or other suitable material are disposed in flanking relation to each of the sheets 142. The rigid side members are, of course, made sufficiently large as to prevent endwise movement of the tobacco leaves even when the sheet 142 is in the distended P2 position.

Figure 8:
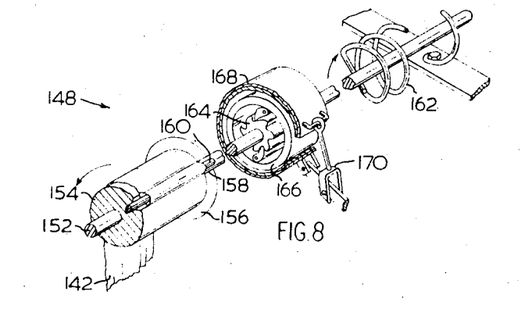
FIG. 8 is a fragmentary perspective view of one arrangement for controlling the tension on the sheet which forms part of the leaf container.

The structure of the tensioning reel 148 for applying tension to flexible sheet 142 is illustrated in FIG. 8. Those skilled in the art will realize that the tensioning reel, per se, could be of a design other than that specifically shown. The spool 148 is carried on a generally horizontally disposed shaft 152. Shaft 152 is rotatably carried on the frame of the harvester. Mounted on shaft 152 is a spool 154 upon which flexible sheet 142 winds. Spool 154 includes an elongated groove therein to receive the rod 160 as well as suitable end plates 156 having slots 158 therein in which the ends of an elongated rod 160 are received. Elongated rod 160 is connected to the upper end of the flexible sheet 142. A suitable spring 162 applies sufficient torsion to shaft 152 to balance the weight of the tobacco leaves as they are deposited in the sheet. A ratchet arrangement 164 prevents the spool 154 from immediately rewinding each time a loaded sheet 142 is removed from spool 154. The ratchet mechanism is contained within a cylindrical casing 166, rotation of which is prevented by a friction brake arrangement 168 including a brake band adapted to come into engagement with the outer surface of cylinder 166. The brake band 168 is connected to a suitable lever arrangement 170 which permits the brake to be manually applied or released.

To rewind an empty sheet 142, the elongated bar 160 with sheet attached is placed on the surface of spool 154 with the rod disposed in the elongated slot provided in the surface of the spool. The friction brake 168 is gradually released thus allowing the shaft, spool and ratchet assembly to rotate. This serves to effect winding up of sheet 142 on spool 154. The brake 168 is then secured before filling of sheet 142 commences. It will be understood that after an initial pre-load has been applied to spring 162, such spring will be retensioned each time by the action of the sheet 142 on winding from the reel due to the action of the weight of the tobacco leaves.

It should be understood that the leaf container and elevator mechanism described above may be used in conjunction with tobacco leaf picking devices other than that specifically described herein. In addition, the leaf container arrangement may be either drawn behind the machine as a separate unit in addition to being carried directly on the harvester as described herein.

It will be understood by those skilled in the art that the present disclosure of a preferred form of the invention has been made only by way of example and that numerous changes in the details of construction and the combination and arrangement of parts may be resorted to without departing from the spirit and scope of the invention as hereinafter claimed.

I claim:

1. A tobacco harvester including means to enable the harvester to travel along a row of tobacco plants, a pair of picking units arranged to be carried along both sides of the tobacco row, each picking unit including defoliating means for removing tobacco leaves lying in a picking swath from the standing row of plants, leaf divider elements for positively separating leaves lying above the picking swath from those lying within the latter associated with each picking unit, the leaf divider elements comprising means for effecting an initial separation of said leaves, respective leaf divider sheets positioned above said defoliating means and extending rearwardly of each of said means for effecting initial separation thereby to maintain said separation, the leaf divider sheets extending towards each other from their respectively associated picking units with their inner confronting marginal edges being spaced apart to define a passageway for the plants of said row as the harvester moves therealong, and leaf orienting means arranged to orient the leaves in the picking swath to assist in the defoliation thereof, said leaf orienting means including an intake mouth respectively associated with each picking unit and suction producing means to produce air flow into each intake mouth, with each intake mouth being located below a respectively associated one of said leaf divider sheets whereby the tobacco leaves in the picking swath orient themselves to positions with their tips pointing generally toward the intake mouths on both sides of the row of plants.

2. The harvester according to claim 1 wherein said intake mouths are located relative to their associated leaf divider sheets and have air flow control means associated therewith for reducing air flows over the upper surfaces of the leaf divider sheets and downwardly between the picking units to reduce the possibility of tobacco leaves above the picking swath being drawn against the leaf divider sheets and thus bruised or damaged.

3. The harvester according to claim 2 wherein each of said inner confronting marginal edges of said leaf divider sheets has an endless guide belt extending therealong, means supporting and driving each guide belt in an endless path at a velocity such that the runs of the guide belts extending along the passageway move at substantially zero velocity with respect to the stalks of the plants in the row as the harvester moves therealong.

4. The harvester according to claim 2 wherein the means for effecting initial separation comprise freely rotatable roller means which rotate as the tobacco leaves brush against them.

5. The harvester according to claim 2 wherein the defoliating means includes means for gripping the oriented leaves and constructed and arranged to draw the engaged part of the tobacco leaf laterally outwardly of the row and away from the stalk of the plant.

* * * * *